Jan. 1, 1963
V. B. SCOTT ET AL
3,071,002
INTEGRATING FLUID METER
Filed April 28, 1960
5 Sheets-Sheet 3
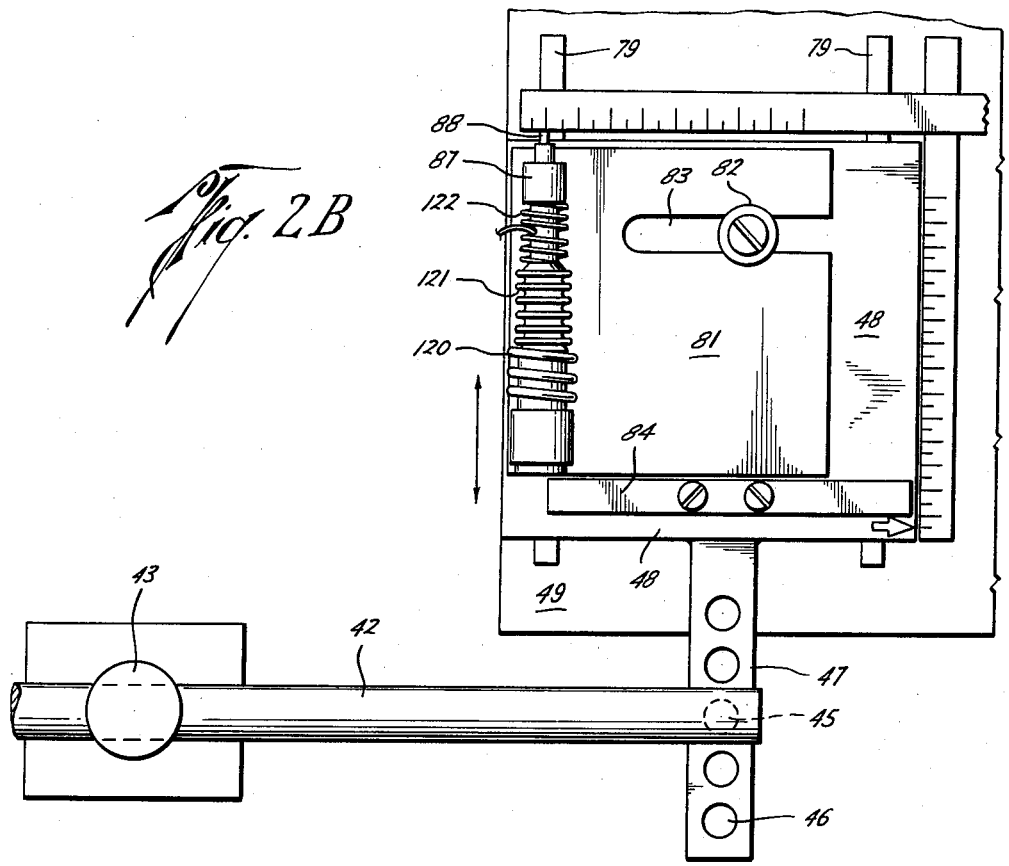
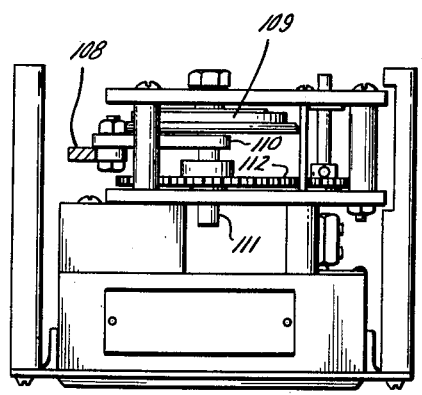
Vernon B. Scott
Clifford M. Peters
INVENTORS
BY Browning, Simms
Ayer & Eickenroht
ATTORNEYS Jan. 1, 1963

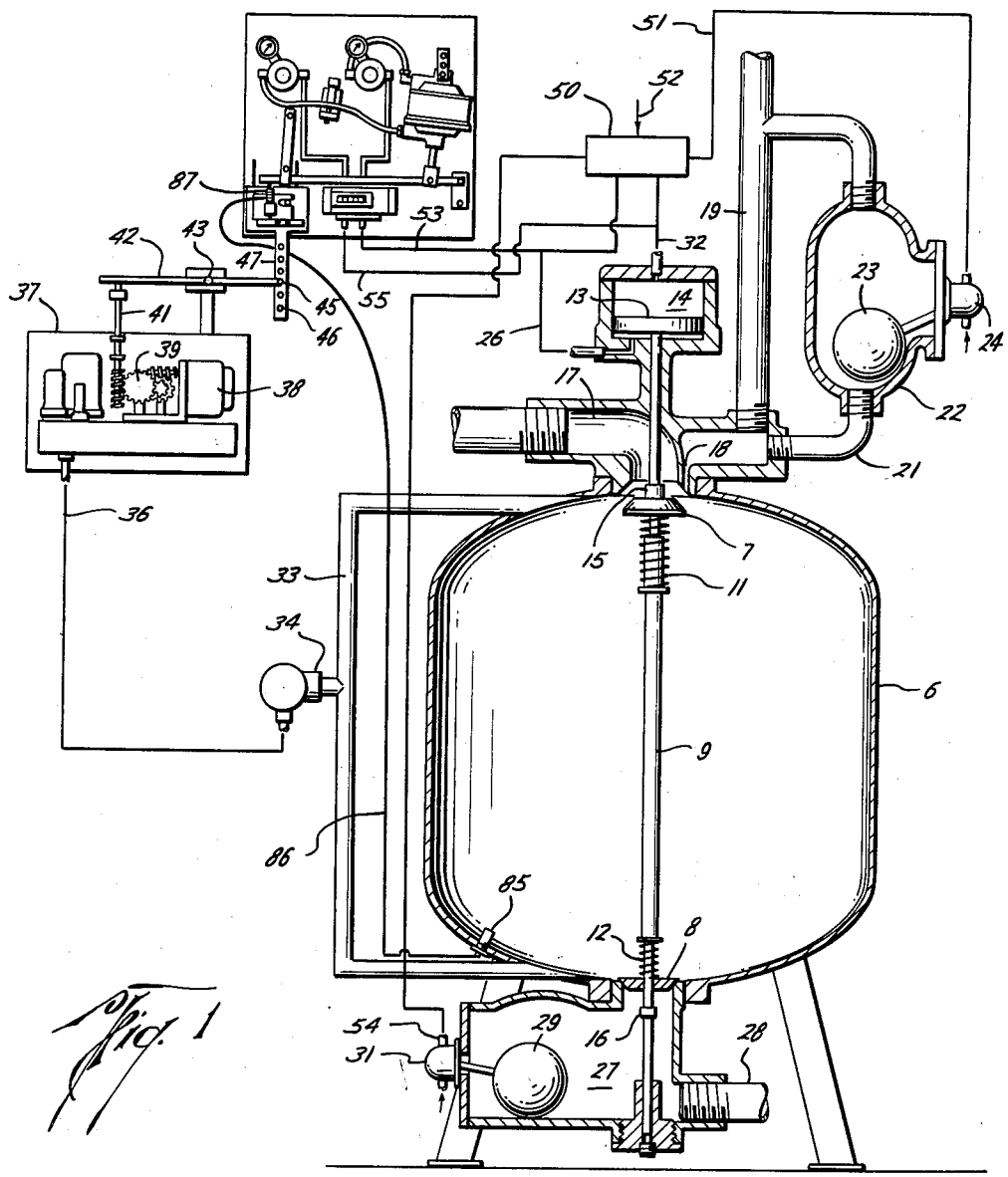

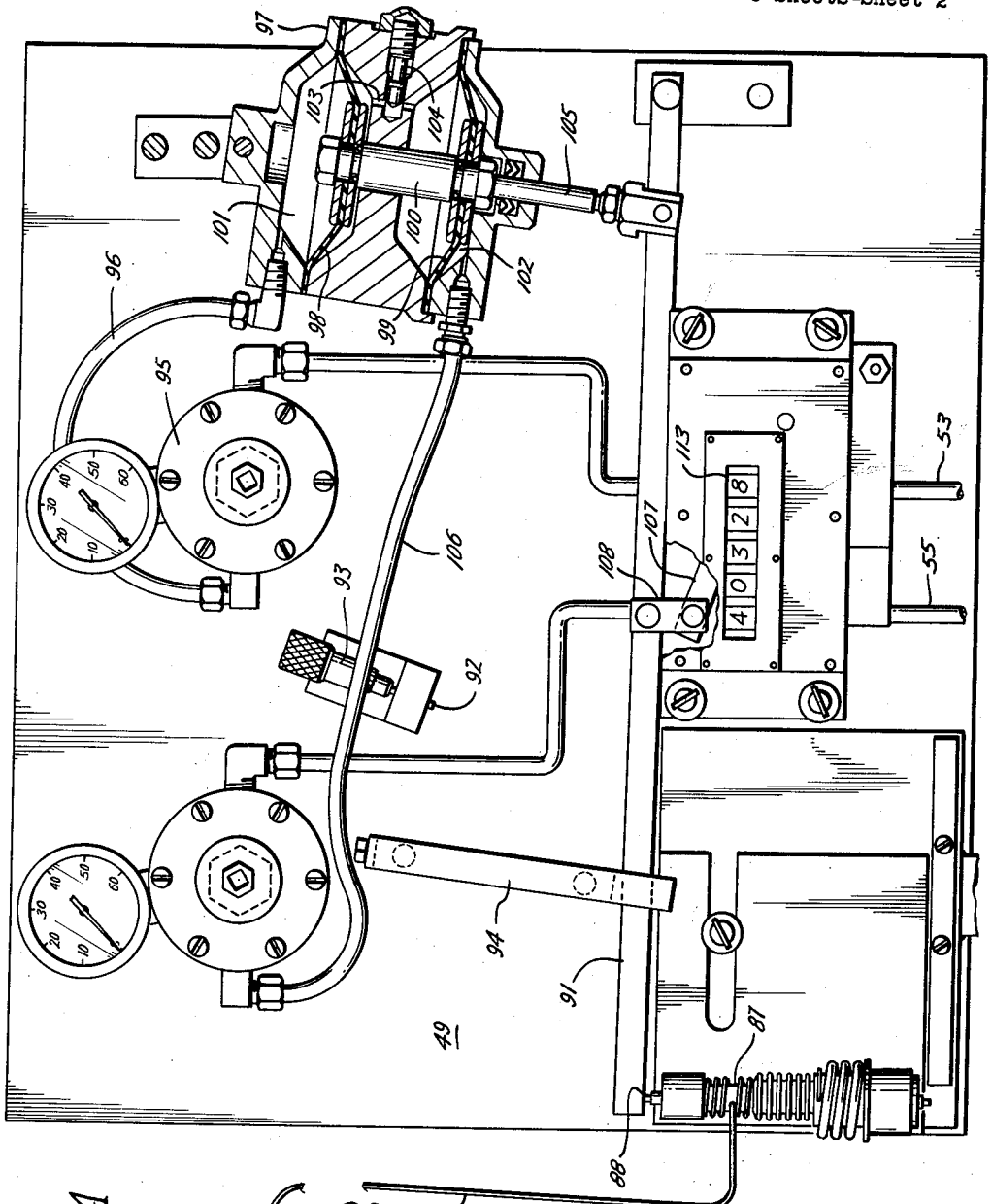

V. B. SCOTT ET AL 3,071,002

INTEGRATING FLUID METER

Filed April 28, 1960

Vernon B. Scott
Clifford M. Peters
INVENTORS

BY Browning, Simmons,
Ayer & Eisenrath
ATTORNEYS

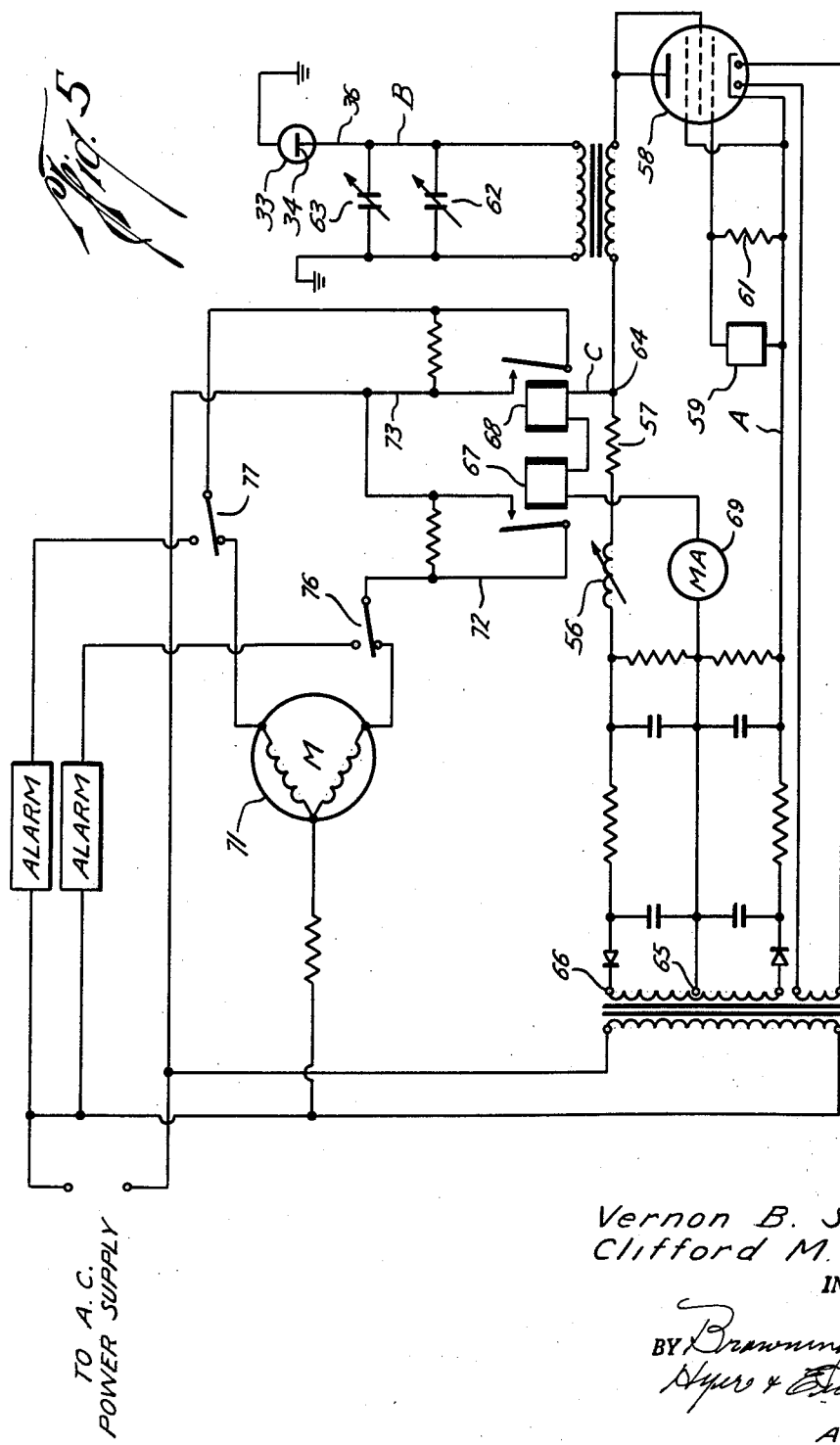

United States Patent Office 3,071,002
Patented Jan. 1, 1963

3,071,002
INTEGRATING FLUID METER
Vernon B. Scott and Clifford M. Peters, Longview, Tex., assignors to U.S. Industries, Inc., New York, N.Y., a corporation of Delaware
Filed Apr. 28, 1960, Ser. No. 25,447
1 Claim. (Cl. 73—224)

This invention relates to improvements in fluid metering devices. It is particularly useful for correcting measured volumes of crude oil, as produced in the field, for expansion or contraction due to variation of the temperature at which the oil is measured from a standard temperature, and for further correcting the measured volume of oil for proportions of bottom sediment and water which may be contained in the oil. In one aspect this invention is a measuring device. In another aspect it is a device for integrating corrections of measured volumes to allow for unrelated variables.

One particular field of use for the device of this invention is in the automatic custody transfer of oil from a least to a pipeline. The accurate measurement of oil as produced in the field has presented difficult problems. Ordinary meters measure the number of barrels of liquid produced but this measurement is frequently quite different from the actual number of barrels of oil transferred due to salt water, sediment and other impurities present in the oil in variable proportions. There is sufficient emulsification of these impurities in the oil that separation by settling for any reasonable length of time is unsatisfactory.

Oil usually is produced under conditions which allows wide variations in the temperature of the crude oil. Expansion and contraction under the influence of temperature fluctuation also introduces errors into the measurement of volumes by ordinary meters.

The utmost accuracy is required in measuring quantities of oil transferred from a least to a pipeline because payment to the lease owner is based upon the volume of oil transferred. Due to the large volumes handled, an error of a very few percent could accumulate to thousands of dollars of over or under payment, so it can be readily seen that both parties will insist upon the most accurate measurements possible.

It is a principal object of this invention to provide a coordinated system for measuring a liquid, normally having a high dielectric constant, in a batching meter; for correcting the measurement obtained to allow for inaccuracies in manufacture of the batching meter; for automatically correcting the measurement to allow for expansion or contraction of the liquid due to variation of the temperature of the liquid at the time of measurement from a selected standard, or reference, temperature; and for automatically correcting the measurement to allow for the presence in the liquid of impurities having a different dielectric constant from that of the liquid.

A more specific object is to provide a system for measuring quantities of crude oil with high precision.

Another object of the invention is to provide an accurate metering system employing meters of the batching type wherein the measured volumes are automatically corrected for variations in the temperature of the oil at the time of measurement and for variations in quantities of water and bottom sediment contained in the oil.

Another object of the invention is to provide a device for automatically integrating corrections of errors in measured volumes due to unrelated factors.

Another object of the invention is to provide a device of this class which is adjustable to make corrections of errors in measured volumes of oil of various grades and flash factors.

Still another object of the invention is to provide a metering system employing meters of the batching type wherein the necessity for close manufacturing tolerances of measuring vessels is eliminated.

Another object of the invention is to provide a device of this class in which accurate corrections of errors may be made in measured volumes of oil, according to both temperature and quantity of bottom sediment and water present in oil, and such corrections may be integrated cheaply and mechanically without the necessity for complicated electrical hook-ups which are difficult to maintain in oil producing locations.

In the present invention, a batching meter, preferably of automatic type, makes the primary uncorrected measurement. A pivoted bar, arranged for reciprocating movement through an arc, moves in one direction to its limit of travel each time the batching meter fills, and to its limit of travel in the opposite direction each time the meter empties. The angular distance through which the bar reciprocates is proportional to the volume of liquid measured by the meter and is limited by an adjustable stop in one direction and by a movable stop in the other direction.

The adjustable stop, preferably operated by a micrometer screw, is disposed to limit angular travel of the bar in one direction. Adjustment of this stop serves to make the angular travel of the bar proportional to the true capacity of the meter and eliminates the necessity for close tolerances in meter manufacture, and also for the use of a means to adjust the capacity of meter tanks, which is frequently necessary in batching meters.

Travel of the bar in the opposite direction is limited by a stop which is moved automatically through a distance proportional to the algebraic sum of functions of variations in dielectric constant and temperature from selected reference, or standard, values. Travel of the bar through the arc between stops is then proportional to the true capacity of the batching meter corrected further for the volume of impurities affecting dielectric constant contained in a batch of liquid measured therein, and still further corrected for expansion or contraction due to temperature at the time the measurement is made. A counter preferably is disposed to be turned by a suitable means carried by the bar, or movement of the bar may actuate a recorder or similar device.

The means for integrating correction for deviation in dielectric constant with correction for deviation in temperature includes a by-pass line, preferably attached to the meter at points just above the outlet thereof and just below the inlet. As the batching meter fills, this by-pass line will also be filled with the liquid being metered.

An insulated probe is inserted into the by-pass line in a manner similar to that described in U.S. Patent No. 2,720,624. This insulated probe and the walls of the by-pass line form a capacitor having variable capacitance, according to the dielectric constant of liquid filling the by-pass line. This capacitor is a part of an electrical circuit to be described in detail later and is so arranged that a change in capacitance between the probe and the walls of the by-pass line will result in driving a reversible electric motor in one direction when the capacitance falls, and in an opposite direction when the capacitance exceeds a preselected reference value.

The reversible electric motor drives a train of gearing arranged to cause a shaft to be moved longitudinally through a distance proportional to the deviation in capacitance from a standard, or reference, capacitance. Thus operation of the probe, the by-pass line, the electric circuit, the motor, the train of gearing, and other equipment auxiliary thereto provides a means for translating variations in dielectric properties of the fluid into proportional movement of the shaft. Movement of this shaft in either direction operates a lever, which preferably is slidably adjustable upon a fulcrum to allow for its use with liquids having different dielectric constants, such as oils of different grades.

An expansible member, preferably of spring loaded bellows type, carrying a second longitudinally movable shaft, is attached to the lever, preferably on a side of the fulcrum opposite to the first shaft and parallel thereto. This second shaft is movable in response to expansion of fluid, preferably gas, contained in a bulb immersed in the liquid in the batching meter. An increase or decrease in pressure, due to expansion or contraction of this gas, is imparted to the gas in a small line, which communicates with the bulb and with the expansible member. This expansible member is disposed to move the second shaft longitudinally in response to an increase or decrease of pressure from the bulb, and both this member and the second shaft are moved by movement of the lever. The second longitudinal shaft limits movement of the pivoted bar in the direction opposite to the micrometer screw stop by means of a stop carried by the shaft, or preferably, by an end of the shaft itself serving as a stop.

It will be seen that the pivoted lever; the first longitudinally movable shaft actuating the lever; and the second longitudinally movable shaft, carried by the lever, and also actuated by the expansion and contraction of gas, form a means for converting a function of movement of the first shaft into algebraically additional longitudinal movement of the second shaft.

Damping means are provided to control the rate of movement of the pivoted bar and to prevent its movement from ever becoming so rapid as to hammer the stops out of adjustment. Preferably, the reciprocating angular movement of the pivoted bar is controlled by the same means used to control opening and closing of valves in the batching meter.

Other objects, advantages and features of the invention will be apparent to one skilled in the art upon a consideration of the specification, the claims and the annexed drawings wherein:

FIG. 1 is a diagrammatic illustration of one preferred embodiment of the present invention, and shows the interrelationships of preferred devices for automatically integrating corrections for variations in volume due to temperature and corrections for variations in quantities of impurities affecting dielectric constant in the liquid measured with a metering vessel of batching type;

FIG. 2A is an enlarged diagrammatical view of the temperature responsive device of FIG. 1, with the pivoted bar, stops and a slow speed motor device disposed to actuate the bar;

FIG. 2B is an enlarged detail of the temperature responsive device and means for carrying it upon the pivoted lever;

FIG. 3 is a plan view of a counter disposed to be actuated by angular reciprocation of the pivoted bar;

FIG. 5 is a schematic wiring diagram of the device of FIG. 4.

Figure 4:
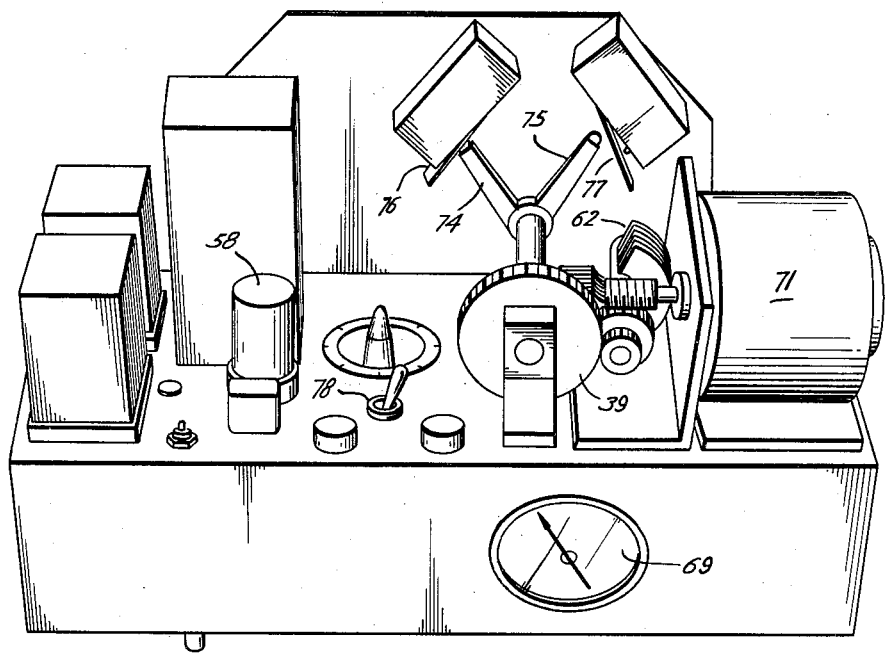
FIG. 4 is an enlarged perspective view of the device 37 in FIG. 1 with the longitudinally movable shaft and drive gears therefor omitted for clarification of illustration.

In the drawings, the reference numeral 6 indicates the tank of a preferred type of batching meter in which oil or other liquid is measured. The particular meter shown is described in detail in copending application Serial No. 634,016, filed January 14, 1957 by Norman F. Brown. While this type of meter has certain advantages which make it a desirable one for use when crude oil is to be metered, it is to be understood that other batching type meters may be used if desired, and that the invention is not limited to any particular form of meter.

In the meter illustrated, valve closure members 7 and 8 are slidably mounted upon a single valve stem 9 and are biased toward their respective closing positions by springs 11 and 12, mounted on the valve stem.

Valve stem 9 is actuated by a piston 13 which reciprocates in cylinder 14 through a distance great enough to cause valve stem 9 to have sufficient overtravel in its reciprocating motion to provide that valve closure members 7 and 8 must both be seated before either of them can become unseated by movement of stem 9. This type of operation results from the sliding fit of the valve closure members 7 and 8 on stem 9, the compressible nature of springs 11 and 12, and the position of collars 15 and 16, rigidly attached to the valve stem.

It will be seen that, starting with the valve in the position illustrated, upward movement of stem 9 will not open outlet valve closure member 8 because of the pressure exerted by spring 12, until the inlet valve closure member 7 has been seated by initial travel of stem 9. After the inlet valve closure member 7 becomes seated, further upward travel of stem 9 results in bringing collar 16 against the lower face of valve closure member 8 and lifting the same against spring pressure exerted by spring 12, thus opening the outlet valve.

The metering vessel 6 is provided with an inlet line 17 adapted to introduce oil from a separator, tank or other source into vessel 6 when closure member 7 is unseated. As the vessel fills, air escapes through a passageway 18 at the side of the inlet valve and through a vent pipe 19. This meter is so arranged that it always overfills before inlet valve closure member 7 seats and closes the valve. Excess liquid coming through line 17 flows through passageway 18 and line 21 into float chamber 22 where it raises float 23. Elevation of float 23 operates a valve 24 which applies pneumatic pressure from a source (not shown) via line 51 to a suitable control device, illustrated as shuttle valve 50.

A preferred type of shuttle valve is shown in copending application Serial No. 634,016, filed January 14, 1957, by Norman F. Brown. However, it is not intended to limit the system of this invention to the use of any particular type of shuttle valve or control. Many such types of valves and control devices are known and, with minor changes in the connections of piping, could be used for applying pressure to control the system of the present invention. Piping connections, detents and pressure release devices have been omitted from the description since these are well known in the art, and the present invention is not limited to any particular arrangement of such elements.

Shuttle valve 50 preferably is of a type consisting essentially of a two-way valve adapted to be reciprocated in a housing by application of pressure to the ends of a reciprocating member. Application of pressure through line 51 moves the reciprocating member (not shown) to the left sufficiently to establish a connection between a supply line for pressure 52 and line 26. Pressure from line 26 is introduced into the bottom of chamber 14 below piston 13 and thus raises valve stem 9, and at the same time, pressure is introduced into line 53 to move the pivoted bar in one direction, illustrated as downward in the drawings.

It will be seen that the valve 7 closes upward from inside vessel 6 after the same has been overfilled with liquid and the volume of liquid trapped in vessel 6 is therefore accurately determined by the capacity of the vessel, with no errors due to imperfect filling of the vessel or to valving in froth. After valve closure element 7 is seated, the outlet valve closure member 8 is unseated by further travel of valve stem 9, thus allowing liquid contained in meter vessel 6 to drain out through chamber 27 and outlet line 28.

When vessel 6 has emptied, float 29 in chamber 27 falls, as the liquid is withdrawn from chamber 27 through outlet line 28. The downward movement of float 29 operates valve 31, which results in admitting fluid pressure from a source (not shown) into line 54. Line 54 pressurizes the end of shuttle valve 50 opposite its connection with line 51, and moves the valve member to the right, thus establishing communication between pressure supply line 52 and line 32, which conducts pressure to the upper surface of piston 13 in chamber 14. This operation also applies fluid pressure to line 55 to drive the pivoted bar upward. Operating valve stem 9 first seats valve closure member 8, and then unseats valve closure member 7, and the cycle of operation is repeated. Since the meter just described is now standard commercial equipment, and readily available on the market, it is believed that the above description is sufficient to indicate the preferred type of batching meter and controls to be used with this invention.

In the practice of the present invention, a by-pass line 33 is provided to communicate with the interior of vessel 6 at a point just below valve closure member 7 when it is in seated position, and at a point just above valve closure member 8 when this member is seated. As vessel 6 fills, it is evident that a sample of the oil also will fill by-pass line 33 at an approximately central position therein. The insulated probe 34 and the walls of the by-pass line 33 form a capacitor whose capacitance will vary, according to the dielectric constant of liquid in line 33, as is shown and described in U.S. Patent No. 2,720,624. The probe is of such shape and size that it does not appreciably affect flow of fluid in by-pass line 33, and may be coated with a thin layer of insulating material to prevent corrosion of the probe metal by salt water or other corrosive materials contained in crude oil. If coated, the coating should have a high dielectric constant so that it will not appreciably lower the total electrical capacity of the probe.

The probe 34 is connected by a co-axial cable 36 to a device indicated generally by the reference numeral 37. The probe, co-axial cable and device 37 form a means for translating changes in dielectric constant of the oil, due to water and bottom sediment contained therein, into proportional longitudinal movement of shaft 41. Device 37 comprises a reversible motor 38; a train of gearing 39, operated by the motor; a variable condenser 62, driven from the train of gearing; a pair of limit switches 76 and 77 (illustrated in FIG. 4) being actuated by the motor; and a longitudinally movable shaft 41 (shown only in FIG. 1) disposed to be moved by the train of gearing. The operation of device 37 is best understood by considering the wiring diagram shown in FIG. 5 in connection with FIGS. 1 and 4.

The wiring diagram shown in FIG. 5, illustrates a circuit designated generally as A containing a power supply; an adjustable inductance 56; a resistor 57; and an oscillating type tube 58 having a crystal 59 in its grid circuit, and a grid resistor 61 having very high resistance. This circuit is transformer coupled to a second part, designated generally as B containing a capacitor which is made up of probe 34 and the walls of by-pass line 33. Portion B also includes a variable capacitor 62 driven by the motor, as illustrated in FIG. 4, and a tuning capacitor 63. It will thus be seen that parts A and B comprise a tunable circuit which can oscilalte at a frequency controlled by the natural frequency of crystal 59. This crystal ordinarily will be quartz having a natural frequency of about 3,524 kilocycles per second. If desired, other types of crystals with other frequencies can be used.

The grid resistor 61 has very high resistance which makes it possible to extend the oscillating range of the circuit to very low values of plate tuning capacitance, or to corresponding high values of inductance.

It is well known in the art that a large decrease or increase in plate D.C. current occurs when the circuit goes into, or out of, oscillation, due to an increase or decrease of capacitance as compared to inductance.

A point 64, between resistor 57 and the transformer coupling of part B of the circuit, is connected to a circuit designated generally as C which connects point 64 with a midpoint tap 65 on the power supply transformer. Resistor 57 has such value that when the current (and voltage) is high, the voltage drop from point 64 to point 66 at the power supply transformer will be greater than the voltage developed between point 66 and mid-point tap 65; and when current (and voltage) are low, the voltage drop between points 64 and 66 is less than the voltage developed from point 66 to point 65. Thus, the flow of current in circuit C will be in one direction when current is high, and in the opposite direction when current is low.

A pair of polarized relays 67 and 68, having points which are normally open, are disposed in circuit C, and the points of one of said relays are closed by flow of current in one direction, while the points of the other relay are closed only when the current flow is in the opposite direction. A milliammeter 69 is included in circuit C to enable easy tuning to a point of no flow in the circuit.

A reversible motor 71, preferably of low speed and of balancing type, is disposed to be turned in one direction when energized through lead 72 as a result of actuation of relay 67 and to be turned in the opposite direction when energized through lead 73, actuated by relay 68. Motor 71, drives the variable capacitor 62 through a suitable train of gearing, shown in FIG. 4, and also drives a pair of arms 74 and 75, disposed to actuate a pair of limit switches 76 and 77 to open lead 72 or lead 73, respectively, when necessary to prevent overtravel of variable capacitor 62. An on-off switch 78 (not shown in the wiring diagram) and suitable tuning knobs are provided. Suitable visual or audio alarms may also be included and disposed to be actuated by operation of limit switches 76 and 77.

In operation, device 37 is tuned to a point of no flow of current in circuit C, and indicates by milliammeter 69, at a standard or reference capacitance of the capacitor made up of probe 34 and walls of by-pass line 33, and variable capacitor 62 is set at approximately its midpoint, or at least in position to permit variation of capacitance in either direction. When the meter tank 6, and consequently by-pass line 33, fills with an oil to be metered, the capacitance of the condenser formed by probe 34 and the walls of by-pass line 33, will vary according to the quantity of water and bottom sediment contained in the oil.

The dielectric constant of oil is usually about 30 times as great as that of water, and the presence of bottom sediment and water results in large changes in the dielectric constant of oil. Variations in dielectric constant therefore are large and are proportional to the quantities of water and bottom sediment present. This factor furnishes an excellent means for measuring quantities of these contaminants.

When the probe capacitance is sufficiently high to cause the oscillating circuit to snap out of oscillation, the D.C. plate current is maintained at a high value and current flows in circuit C. This operation actuates a relay to turn the motor in a direction to drive variable condenser 62 which decreases total circuit capacitance until the capacitance is reduced to a point of no flow in circuit C. At this point, the normally open relay points cut off flow of current to motor 71. The total angular distance through which the motor 71 must turn to drive variable capacitor 62 and thus balance the circuit, is proportional to the probe capacitance, which in turn is a function of the proportion of bottom sediment and water contained in the oil. The train of gearing 39 driven by the motor, moves shaft 41 longitudinally through a distance proportional to the total travel of the motor. Thus, the variation in dielectric properties of the fluid are translated into proportional longitudinal movement of shaft 41.

If the probe capacitance is below a standard or reference value, the oscillating circuit will remain in oscillation, due to the high resistance of grid resistor 61 and the presence of crystal 59 in the grid circuit. The plate D.C. current will then be low and a resulting flow of current through circuit C will occur in an opposite direction to that when grid capacitance is high. This flow of current actuates a relay to turn the motor in a corresponding opposite direction, reversing the movement of shaft 41.

From the above, it will be seen that device 37 may be tuned to an expected standard or reference probe capacitance when installed on a batching meter, and need not be tuned manually again until the limit switches operate. So long as deviations from the standard or reference capacitance are within the expected limits, operation is automatic, translating the dielectric properties of further volumes of oil measured in the metter into corresponding longitudinal movements of shaft 41.

The position of the end of shaft 41 determines the position of one arm of a pivoted lever 42, disposed to rotate about a sliding pivot 43. An arm of lever 42, illustrated as on the opposite side of pivot 43 from shaft 41, carries a connecting means, illustrated as pin 45, adapted to fit into an opening 46 in a reciprocable member 47. A number of openings 46 are provided in member 47 so that pin 45 may be inserted into any selected opening to insure that the vertical position of member 47 will be within an expected range; and that vertical reciprocating movement of member 47, resulting from movement of shaft 41, will not be limited by an end of guide slots 79 in plate 49. Reciprocable member 47 carries plate 48 having flanges (not shown) disposed to slide in guide slots 79 of a suitable support plate 49. Plate 81 is carried by plate 48 and is laterally adjustable thereon by means of screw 82 and slot 83. Plate 81 is maintained in vertical alignment by having its lower edge in contact with a horizontal bar 84 which is attached to plate 48.

A bulb 85, containing compressible fluid, is inserted into meter tank 6 at a point where it is exposed to the temperature of the oil being metered. This bulb is preferably thin-walled and of a material which will permit good heat transfer from the oil to the compressible fluid in the bulb. Bulb 85 communicates through line 86 with an expansible member, designated generally as 87, disposed to move a shaft 88 longitudinally in response to pressure applied to member 87.

Bulb 85, line 86 and expansible member 87 thus form a means for translating variations in temperature of the fluid into proportional longitudinal movement of shaft 88 and pivoted lever 42, member 47, along with plates 48 and 81, with their attachments and adjustments, form a means for converting a function of the movement of shaft 41 into algebraically additional longitudinal movement of shaft 88.

The upper end of shaft 88 forms or carries a stop limiting movement of the pivoted bar 91 through an arc which is limited in the opposite direction by stop 92 controlled by a micrometer screw 93. Movement of bar 91 between stops 92 and shaft 88 is then directly proportional to the true volume of oil measured. Also, movement of this bar is corrected for inaccuracies in the manufacture of measuring tank 6 and further corrected for variations in temperature at the time the measurement is made, from a standard or reference temperature, and for variations in dielectric constant (due to water and bottom sediment), from a standard or reference dielectric constant. A guide 94 is attached to a supporting member 95 to prevent bar 91 from being bent outward away from the supporting member or plate 49.

Reciprocation of pivoted bar 91 through an arc between stops 92 and 88 occurs as the meter fills and empties. When the meter is filled, operation of valve 24 applies pressure from a supply of fluid under pressure through line 51 to shuttle valve 50, thus pressurinzing line 26 through a connection to the supply of gas under pressure 52. Line 53 communicates with line 26 and also is pressurized by the operation of shuttle valve 50. It is desirable that line 53 contain a pressure reducer 95, and that it have a flexible portion 96 attached to a double diaphragm valve motor, designated generally as 97. Application of pressure through this line to the upper side of diaphragm 98 results in downward movement of both diaphragm 98 and 99, since the two diaphragms are connected by a link 100. Spaces 101 and 102, within the diaphragm motor disposed between diaphragms 98 and 99, are filled with a liquid, preferably an oil. These spaces are interconnected by a bleed passage 103 which may be adjusted by manipulation of a plug 104 to obtain the desired degree of constriction.

Flow of oil through bleed passage 103 is necessary to permit the diaphragm motor to operate in response to pressure flowing through line 96. The downward movement of diaphragms 98 and 99 occurs at a slow speed and carries link 105, attached to link 100, slowly downward. Link 105 is pivoted to bar 91 and operates bar 91 at a sufficiently slow speed that stop 88 will not hammer out of position when contacted with bar 91.

Bar 91 will then remain in lowered position until tank 6 is emptied. At this time, valve 31 operates to apply pressure through line 54 on the opposite side of shuttle valve 50, to release pressure in line 26 and then to apply pressure to line 32 which communicates with line 55. Line 55 has a flexible portion 106 communicating with the diaphragm motor beneath the lower diaphragm 99. The diaphragm motor 97 then operates to raise bar 91 slowly, until it is stopped by contact with stop 92. The bar then remains in position until the meter tank is again filled, and valve 24 operates.

A pivoted link 107 is attached to bar 91 by a suitable attachment member 108 and serves to drive a counter through an overrunning clutch 109, by member 110. Overrunning clutch 109 drives shaft 111 and gear 112, carried thereon, only when the bar 91 moves in one direction. Gear 112 drives a counting device which shows accurately the total amount of fluid metered.

It will be seen that many variations may be made in the system described above without departing from the spirit of the invention. For example, many types of batching meters are known and could be used in place of the meter described. The controls for filling and emptying the meter, and for operating the pivoted bar, may be fluid operated, electrical, mechanical or manually operated. Many types of dash pots could be substituted for the double diaphragm motor described and a suitably damped piston motor would be effective. Temperature and dielectric constant variations might be translated into rotary movements of shafts carrying gears or cams and be effective in locating the stop for angular reciprocation of the pivoted bar. The counter described might be omitted and reciprocation of the pivoted bar might be used to actuate a recording pin or other device. The control device may be arranged so that movement of the pivoted bar in response to filling and emptying of the metering vessel is in opposite directions from those described. The pivoted lever may have both temperature responsive and dielectric constant responsive members connected on the same side of the fulcrum; or it may have an extensible arm, for adjusting to oils of various grades, substituted for the positionally adjustable pivot, shown and described. A great many other variations in arrangement of the apparatus described will suggest themselves to those skilled in the art.

From the foregoing it will be seen that this invention is one well adapted to attain all of the ends and objects hereinabove set forth, together with other advantages which are obvious and which are inherent to the device.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

An integrator for correction of measurement of quantities of fluid for proportions of impurities affecting dielectric properties therein and for variations in volume due to temperature at the time of measurement comprising an insulated probe inserted into a line containing the fluid measured and forming a capacitor with walls of the line; a crystal controlled vacuum tube circuit capable of sustained oscillations and having a resonant portion including said capacitor in a plate circuit of the vacuum tube; a variable capacitor connected in said resonant portion of the circuit; a grid resistor in said circuit having sufficiently high resistance to result in sustained oscillation of said circuit at low capacitance; a reversible electric motor connected to be driven in one direction when said circuit is in oscillation and in the opposite direction when the circuit is out of oscillation; means for driving said variable capacitor from said motor to balance the capacitance of the circuit at the point of transition between oscillation and non-oscillation; a train of gearing, driven by said motor, disposed to move a longitudinally movable shaft; means for translating variations in temperature of the fluid into longitudinal movement of a second shaft comprising a bulb filled with compressible fluid immersed in the fluid measured and an expansible member actuated thereby to move a second shaft; means for converting the function of the movement of the first mentioned shaft into algebraically additional longitudinal movement of the second shaft; a pivoted bar disposed to be moved through an angular distance proportional to a volume of fluid measured and to be limited in such angular movement by contact with an end of said second shaft; a counter; and means, actuated by angular movement of the bar in one direction, for turning the counter through a distance proportional to angular movement of the bar.

References Cited in the file of this patent

UNITED STATES PATENTS

| | | |
|---|---|---|
| 2,671,657 | Cooper | Mar. 9, 1954 |
| 2,920,483 | Hebard et al. | Jan. 12, 1960 |
| 2,924,098 | Greatorex | Feb. 9, 1960 |
| 2,939,077 | Branin | May 31, 1960 |